UNITED STATES PATENT OFFICE.

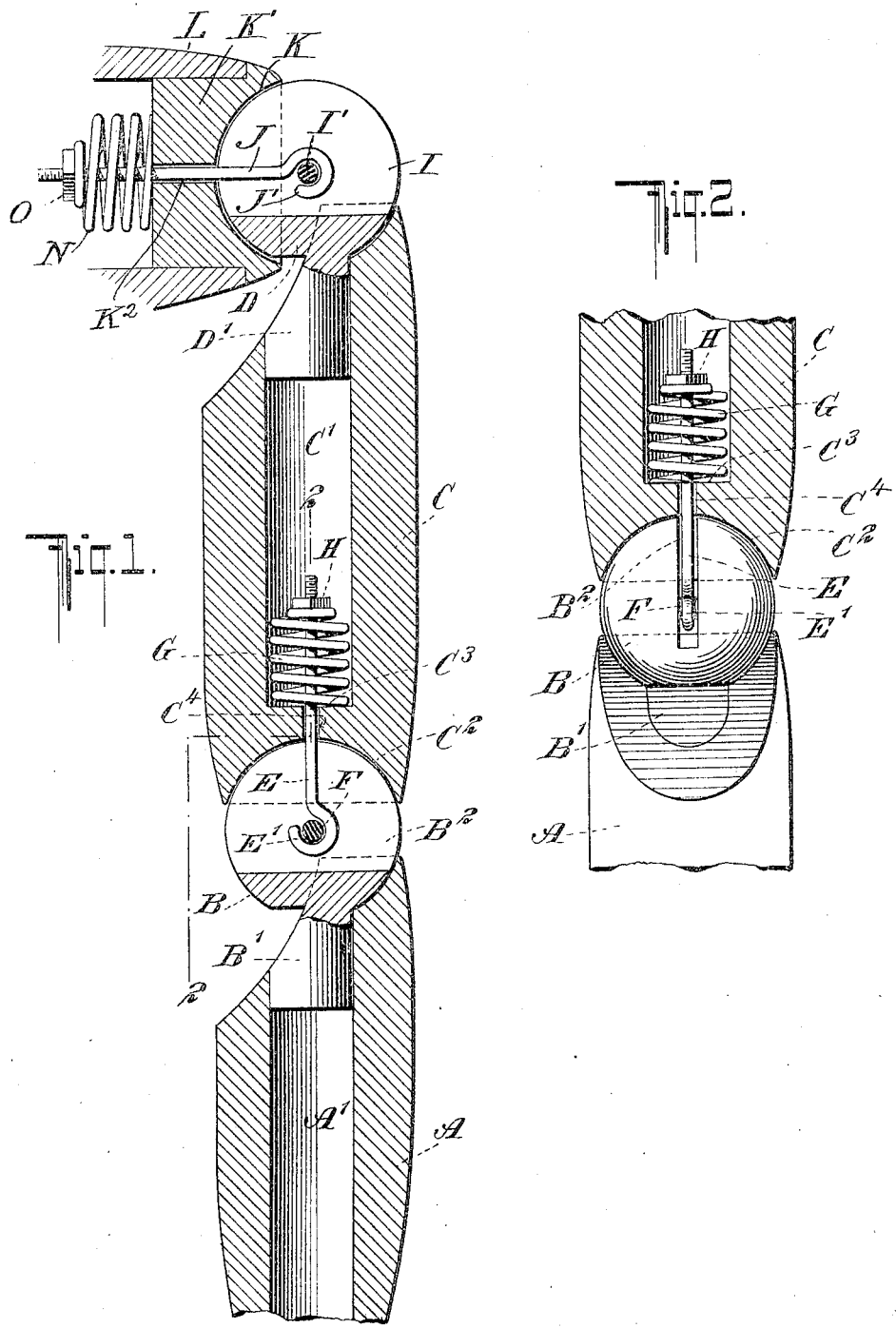

ISIDOR KOLAR AND VALENTINE KOLAR, OF JERSEY CITY, NEW JERSEY.

LIMB FOR DISPLAY-FIGURES.

No. 807,473.

Specification of Letters Patent.

Patented Dec. 19, 1905.

Application filed June 24, 1905. Serial No. 266,760½.

*To all whom it may concern:*

Be it known that we, ISIDOR KOLAR and VALENTINE KOLAR, subjects of the Emperor of Austria-Hungary, and residents of Jersey City, Hudson county, State of New Jersey, have invented certain new and useful Improvements in Limbs for Display-Figures, of which the following is a specification.

Our invention relates to limbs such as are used on display-figures, and has for its object to provide a joint for said limbs which can be adjusted to take up any shrinkage or expansion of the material from which the limb is made. The different parts of the limb can also be fixed in any position with our improved joint.

The invention will be fully described hereinafter, and the features of novelty will be pointed out in the appended claims.

Reference is to be had to the accompanying drawings, in which—

Figure 1 is a sectional view of a limb with our improvements applied thereto, and Fig. 2 is a sectional view on the line 2 2 of Fig. 1.

We have illustrated our invention as applied to an arm, although it is to be distinctly understood that the said improvements may be used in connection with the legs of a figure as well.

A represents the lower arm-section, which is provided with a chamber A′, into which is adapted to fit the projection B′ of the ball B. This projection B′ may be secured in position in the arm-section A in any suitable manner— as, for instance, by gluing. C is the upper-arm section, which is also provided with a chamber C′. Into this chamber C′ is secured in any convenient manner the projection D′ of the ball D, which ball and projection may be similar to the ball B and projection B′. The upper-arm section C is further provided with a socket C², into which fits the ball B.

B² is a slot or recess which extends across the ball B. Into this slot B² extends a rod E, terminating at its one end in a flat hook E′, arranged to take over or engage a screw F, which passes across the slot B², as shown in Fig. 2. This rod E at its free end is screw-threaded and projects through an opening C⁴ into the chamber C′. A spring G surrounds this rod E and has its one end in engagement with the end wall C³ of the chamber C′ and its other end in engagement with a nut H, which is screwed on the free end of the rod E. It will be noticed that the side walls of the chamber C′ are substantially parallel and form a guideway for the spring G. The ball D is also provided with a slot I, substantially the same as the slot B² and into which projects a rod J, with a hook J′, which engages a screw I′, extending across the slot I, all in substantially the same manner as described with regard to the ball B, rod E, and its various parts. The ball D is arranged to work in a socket K of a member K′, which projects into and is secured in the body-section L of the figure. The rod J, which is also screw-threaded at its free end and is similar to the rod E, extends through an opening K² of the member K′ into a chamber M of the body-section L. A spring N surrounds the rod J and has its one end in engagement with the member K′ and its other end in engagement with a nut O, screwed on the rod J.

It will be understood that the parts relating to the joint between the upper and lower arm sections, or, in other words, the elbow-joint in this case, and the parts relating to the joint between the upper-arm section and the body-section, or, in other words, the shoulder-joint, may be of the same general construction and may operate in the same way.

We will now describe the operation of our improved joint, using the elbow-joint as an illustration, it being understood, as before pointed out, that the shoulder-joint or the joints between the various leg-sections of a figure operate in the same manner. If the joint becomes loose from wear or from shrinkage of material, the lower-arm section A is turned about its longitudinal axis and with it the rod E. The nut H, being held against turning by frictional contact with the spring, will be screwed down on the rod E, thus compressing the spring and pulling the ball B into the socket C². The slot B², which extends across the ball B, permits the lower-arm section to swing into various positions about the screw F as a pivot. The hooks E′ and J′ are flat and are so fitted within the slots B² I that the said hooks, and consequently the rods E J, cannot turn relatively to the balls B D when the sections A C are turned about their longitudinal axes. The rods E J are therefore compelled to turn with the sections A C in such a case and the proper adjustment of the spring tension is thus secured.

We claim as our invention—

1. In a joint for display-figures and the like, the combination of two members, a ball secured to one of said members at one end thereof and loosely fitting into the adjacent end of the other member, said ball being provided with a transverse slit or recess, and with a central pin extending through said recess, a rod secured to the member into which the ball is loosely fitted, said rod being provided with a flat end portion engaging the said central pin of the ball, a spring located in the member to which said rod is secured and having a tendency to draw the ball toward said member, and a nut screwed on said rod and engaged by said spring.

2. In a joint for display-figures and the like, the combination of two members chambered at their adjacent ends, a ball set between said adjacent ends and having a loose engagement with one of them, said ball having a stem or projection fitted into the chambered end of the other member, the ball being also provided with a transverse slit or recess, and with a central pin extending therethrough, a rod secured to the member which the ball engages loosely, said rod extending into the chamber of said member and also into the slit or recess of the ball and being provided with a flat end portion engaging the said central pin, a spring surrounding said rod within the chamber of the member to which said rod is secured, and having a tendency to draw the ball toward said member, and a nut screwed on said rod and engaged by said spring.

In testimony whereof we have signed this specification in the presence of two subscribing witnesses.

ISIDOR $\overset{\text{his}}{\times}$ KOLAR.
VALENTINE $\overset{\text{mark}}{}$ KOLAR.

Witnesses:
 JOHN LOTKA,
 JOHN A. KEHLENBECK.